(12) United States Patent
Haley

(10) Patent No.: US 7,009,912 B1
(45) Date of Patent: Mar. 7, 2006

(54) METHOD AND SYSTEM FOR DETECTION OF BROADBAND ENERGY

(75) Inventor: Paul H. Haley, Monroeville, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1826 days.

(21) Appl. No.: 07/429,117

(22) Filed: Oct. 30, 1989

(51) Int. Cl.
*G01S 3/00* (2006.01)

(52) U.S. Cl. ........................................ 367/124; 342/21
(58) Field of Classification Search ................... 375/1, 375/130, 147; 367/124; 342/21
See application file for complete search history.

(56) References Cited

U.S. PATENT DOCUMENTS 4,656,642 A * 4/1987 Apostolos et al. .............. 375/1
4,716,574 A * 12/1987 Baier et al. ..................... 375/1

OTHER PUBLICATIONS

J. Munier and G. Delisle, "Spatial Analysis in Passive Listening Using Adaptive Techniques"; Proceeding of the IEEE, vol. 75, No. 11, Nov. 1987, pp. 1458-1471.
S. Kay and S. Marple, Jr., "Spectrum Analysis—A Modern Perspective"; Proceedings of the IEEE, vol. 69, No. 11, Nov. 1981, pp. 1380-1419.

* cited by examiner

Primary Examiner—Daniel T. Pihulic

(57) ABSTRACT

A system and related method for the detection of low power broadband signal sources in a high noise environment. The system uses multiple collinear arrays of sensors to receive data signals. The sensor-to-sensor spacing within the arrays is greater than one-half the wavelength of the center frequency associated with the broadband spectrum of interest. The signals are processed using nonlinear spectral estimation to remove periodic signals from the data signals to obtain broadband data. A cross correlation matrix is formed from the broadband data. Nonlinear spectral estimation is applied to the cross correlation matrix to determine the angular direction of the low power broadband signal sources with respect to the arrays.

25 Claims, 4 Drawing Sheets

METHOD AND SYSTEM FOR DETECTION OF BROADBAND ENERGY

BACKGROUND OF THE INVENTION

1. Field of Invention

The present invention relates to the detection of broadband energy sources. More particularly, the present invention uses stochastic beam forming to effectively resolve low level sources amid high level background noise.

2. Description of the Related Art

Beam forming has previously been used in the detection of signals for a narrow band noise case where the source has distinct tonal frequencies or a high signal-to-noise ratio case. Beam forming or spatial analysis uses linearly spaced sensors to estimate the angular or spatial distribution of energy incident upon an array over a given period of time. In forming a beam one uses one of two known methods of beam steering, that is, phase shift steering or time delay steering.

In the detection of broadband signals, one must use a combination of both time delay steering and phase shift steering. In time delay steering one delays the time between outputs of the transducers to obtain signal correspondence. The output of the array is the sum of each sensor signal delayed by an amount proportional to the sensor's position in the array.

In phase shift steering one shifts the phase of the output signal from one transducer or sensor to the next along an array of transducers which results in the steering of the beam. Specifically, the signals from the sensors are modulated by bandshifting the signals by a common carrier. The modulated signals are then low pass filtered. Recently, use has be made of a cross correlation matrix developed from the low pass filtered signals. Namely, the rows and columns of the cross correlation matrix contain complex sinusoids whose frequencies are proportional to the sines of the off-axis displacements of the direction of arrival of the plane waves. Note, these plane waves are spatial signals having planar coherence. An article entitled "Spatial Analysis in Passive Listening Using Adaptive Techniques," IEEE, Vol. 75, No. 11, November 1987, pp. 1458–1471, describes various methods of demodulating this information using the inverse of the cross correlation matrix.

There are, however, several important limitations on such approaches to beam forming. When the received signals contain strong tonals, the sensor to sensor spacing of the arrays must be less than $\lambda/2$, where $\lambda$ is the wavelength of the highest frequency of interest. This condition is necessary to avoid multiple solutions to the direction of arrival problem due to spatial undersampling and the attendant aliasing phenomenon. Moreover, these phase shift methods cannot easily accommodate failed or missing sensor data. Finally, and most important, these narrow band approaches assume the presence of tonals within the narrow band. If no tonals exist, these phase shift methods fail.

The present invention provides a solution to the problems and limitations of the prior art concerning broadband signals.

SUMMARY OF THE INVENTION

It is an object of the present invention to implement an angle domain narrow band filter to detect the spatial coherence of a broadband signal.

It is also an object of the present invention to provide a system having multiple collinear arrays in which large sensor-to-sensor spacing is possible.

It is also an object of the present invention to detect the angular direction of low power broadband signal sources in a high noise environment.

It is also an object of the present invention to detect spread spectrum transmitters without knowledge of the encoding technique.

It is also an object of the present invention to enable the present invention to operate in the presence of signals containing both broadband and narrow band signals.

It is also an object of the present invention to remove data corresponding to failed sensors without serious effect on precision.

The above objects can be attained by a system and related method for the detection of low power broadband signal sources in a high noise environment. The system uses multiple collinear arrays of sensors having sensor to sensor spacings greater than one-half the broadband wavelength.

The sensors receive signals which are processed to determine the direction of sources emitting broadband signals. The processing is briefly described as follows. First, periodic signals contained within the signals are removed using nonlinear spectral estimation. From the resulting broadband samples a vector of complex samples is formed for each time slice. Next, a square matrix for each vector is obtained by computing the outer product of each vector and its transpose complex conjugate. The matrices are then averaged to form a cross correlation matrix. The diagonals of the cross correlation matrix are then averaged to form a complex vector. This complex vector has the direction of the point sources embedded in it in terms of complex sinusoids. The frequencies of the complex sinusoids are proportional to sines of the arrival angles of the sources. The frequencies of the complex sinusoids are flushed out using nonlinear spectral estimation to derive the arrival angles of the sources.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed toward the detection of broadband energy sources. The method of the invention operates without knowledge of the spectral characteristics the broadband signals by detecting the spatial coherence of a signal emitted from a presumed point source.

In general, the present invention uses a collinear array of sensors to receive broadband signals emitted by broadband energy sources, detects the spatial coherence of the broadband signals using phase shift steering implemented by an angle domain narrow band filter, and determines the direction of the broadband sources relative to the array. A detailed description of the present invention is provided below.

The present invention uses a linear array of sensors to detect broadband signals transmitted from a source. In general, the present invention uses K linear arrays with $N_s$ sensors uniformly spaced at intervals $d_k$, k=1 to K. The spacing between the sensors of a linear array varies depending upon the embodiment selected.

Figure 1:
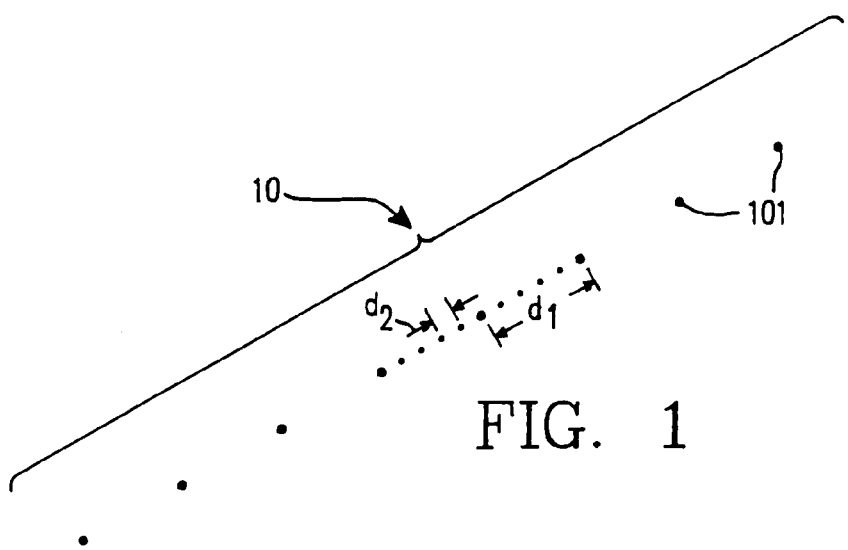
FIG. 1 is a diagram illustrating a first arrangement of sensors within arrays according to the present invention.

FIG. 1 illustrates the preferred embodiment 10 of the present invention having one large array and a second small array preferably contained within the first large array. The need for the second array arises because the large array uses sensor spacing $d_1$ greater than $\lambda/2$, where $\lambda$ is the wavelength of the center frequency associated with the broadband spectrum of interest. Using such a spacing creates an ambiguity in direction which a single array cannot resolve. A second or small array is used to resolve the ambiguity resulting from the first array. As illustrated in FIG. 1, the small array has sensor spacing $d_2$ less than $\lambda/2$. The small array can resolve the direction of point sources without ambiguity, but the resolution is crude. The small array is used to identify the direction of the presumed point source within perhaps five degrees, and then the large array is used to pinpoint the direction of the source.

Figure 2:
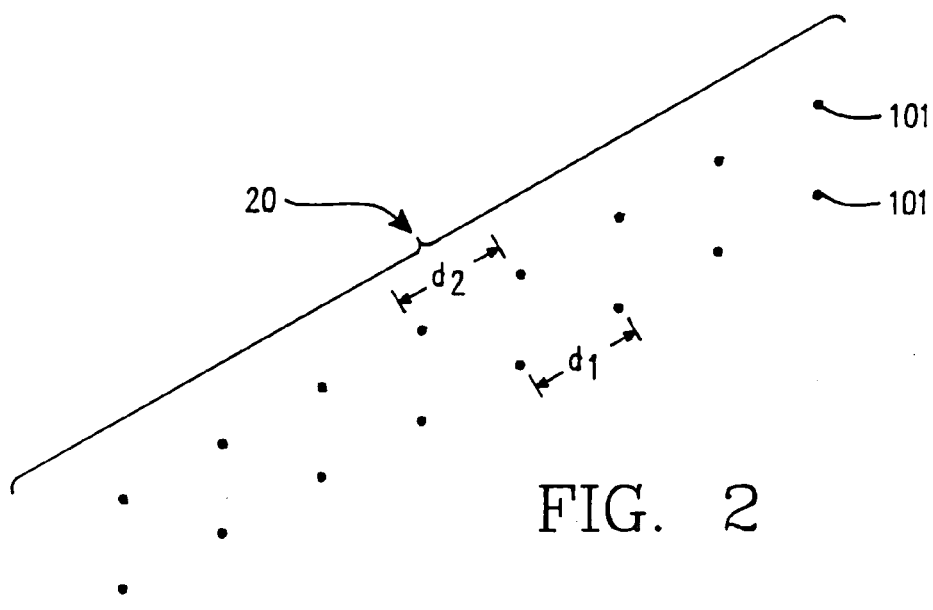
FIG. 2 is a diagram illustrating a second arrangement of sensors within arrays according to the present invention.

FIG. 2 illustrates a second embodiment 20 of the present invention having two large arrays. The spacing for each array differs and is chosen such that the reciprocal lengths $1/d_k$, k=1 to K, are relatively prime. Note, the spacing of each sensor is greater than $\lambda/2$. The use of relatively prime spacing simplifies the calculations involved in resolving the ambiguity in the direction of sources. For example, the numbers 4 and 5 are relatively prime, multiplying the reciprocal lengths using these prime numbers by a constant could provide sensor spacings of five feet in one array and four feet in the other array, respectively.

The ambiguity in direction is resolved by a novel application of the Chinese remainder theorem. The Chinese remainder theorem states that if integers $n_1, n_2 \ldots n_N$ are relatively prime, then every integer from 0 to M-1, where $M = n_1 \cdot n_2, \ldots, n_n$, has a unique set of remainders when divided by $n_1, n_2, \ldots, n_N$. In the present invention the phase shifts between the two arrays represent the remainders which uniquely specify the direction even though multiple solutions, i.e., ambiguity, exist when the arrays are considered individually. That is, only one direction will match the multiple solutions of both arrays.

In addition, as illustrated in FIGS. 1 and 2, sensors 101 are evenly spaced in their respective arrays. Such spacing, although not necessary, greatly simplifies calculations. Although the arrays are preferably linear, the system can tolerate some misalignment in the direction perpendicular to the plane of the incident signals because the system is fairly insensitive to such misalignment.

The present invention is designed to compute the direction of a source emitting broadband energy. In a sonar application, for example, the array of sensors is placed on the ocean floor. The system then detects the angular direction of broadband sources relative to the array. The present invention, however, can be modified to calculate the depth of the source by providing an orthogonal array configured perpendicular in the depth direction to the plane of the first array. Also, using additional array structures located at different positions, one can compute the range of a source using the principle of triangulation.

For sonar applications the frequency range of typical operation in the ocean is between 200 and 1000 Hz. This typical frequency range results from the attenuation of frequencies over 1000 Hz and the impracticability of very long arrays necessary to receive signals below 200 Hz. A typical sonar application would space sensors of the large array on the order of 5–10$\lambda$ and would have an array which is approximately a kilometer in length.

As a result, the length of the arrays and the spacing of the sensors can be adjusted according to the particular application, the frequencies involved, etc.

Figure 3:
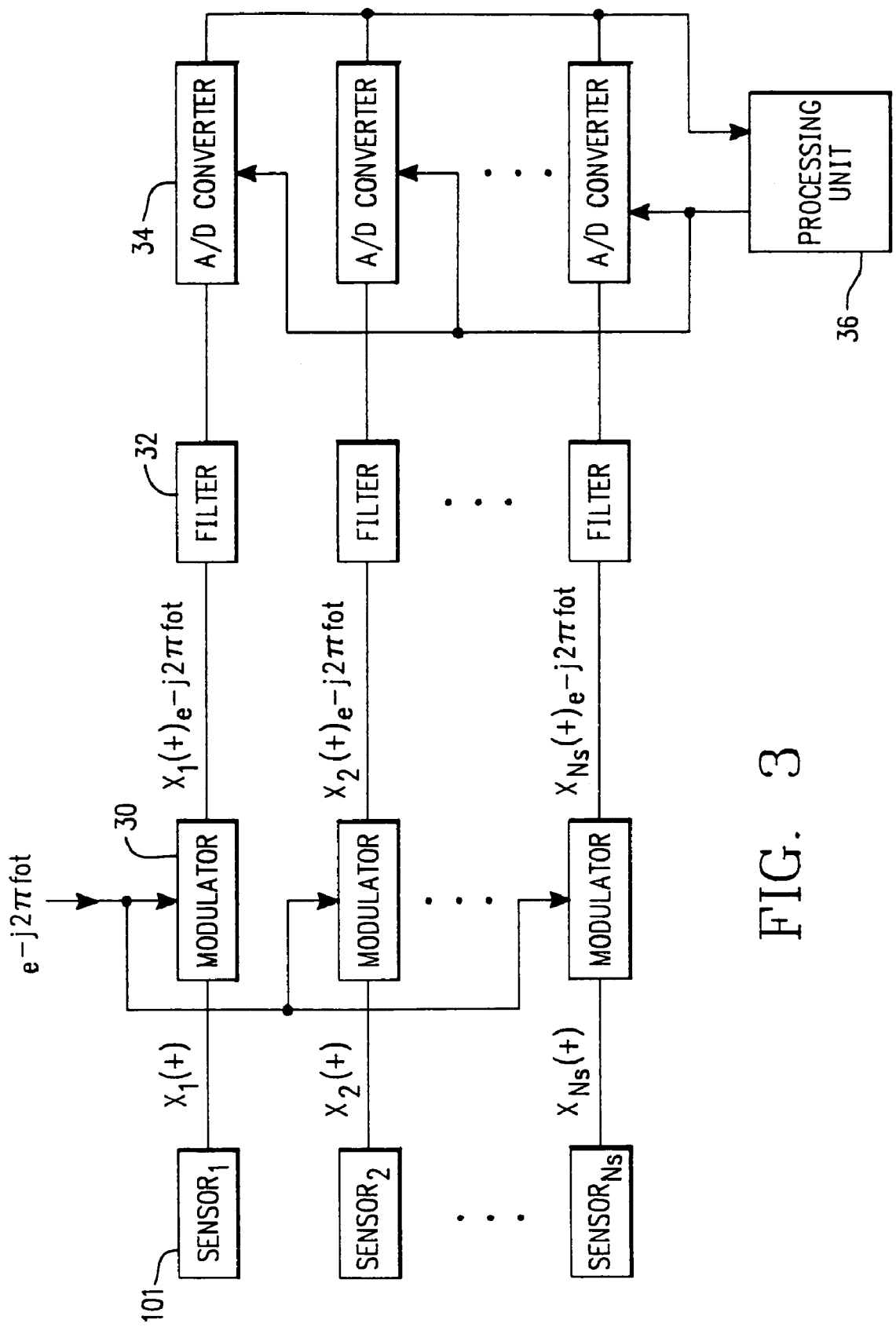
FIG. 3 is a block diagram of the system of the present invention.

FIG. 3 illustrates the modulation and data sampling features of the present invention. Signals x(t) from sensors 101 are modulated by modulators 30 using a carrier signal. For example, as illustrated in FIG. 3, $e^{-j2\pi f_o t}$ is a suitable carrier signal. The carrier frequency $f_o$ is the center frequency of the broadband spectrum of interest. The effect of the modulation is to band shift the sensor signals x(t) by the carrier frequency $f_0$. The modulated signals z(t) are represented as $$z_{ik}(t) = X_{ik}(t) e^{-j2\pi f_o t} \qquad (1)$$

for the $i^{th}$ sensor in the $k^{th}$ array. In addition, it is important that the carrier signal be synchronized across the entire array of sensors.

Figure 4:
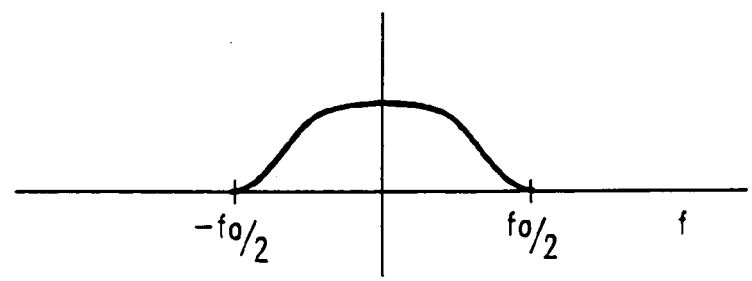
FIG. 4 is a graph illustrating filter characteristics of a low pass filter.

Filters 32 are low pass filter which pass a broad range of frequencies. Preferably, the range of frequencies passed by the filters 32 is on the order of the carrier frequency $f_0$. FIG. 4 provides an illustration of the typical filter characteristics for filters 32. The filtered signal is then, $$y_{ik}(t) = \int_{-\infty}^{t} h(t-s) z_{ik(s)} \, ds \qquad (2)$$

Processing unit 36 samples each of the analog-to-digital (A/D) converters 34 to obtain digital data which corresponds to analog signals x(t) from respective sensors 101. The sampled digital signal is $y_{ik}$ (nT) where T is the sampling time and n=1 to $N_T$. Each time such sampling occurs is referred to as a time slice. The sampling rate is preferably at a frequency below the Nyquist frequency. Although one may sample at a higher rate, it is not preferred because the samples tend to become temporally correlated due to the auto-correlation characteristics of the filters 32. One is able to more effectively reduce the variance of error by sampling at a rate below the Nyquist frequency because background noise may be more effectively suppressed when the sample remains temporally uncorrelated.

Figure 5:
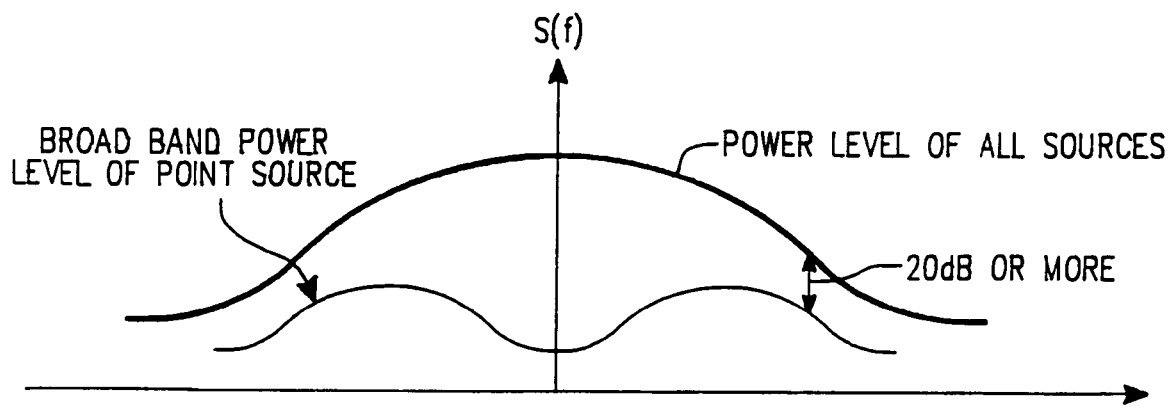
FIG. 5 is a graph of the power spectral density of point sources as a function of frequency.

The present invention is effective even if the signal-to-noise ratios is less than –20 db. The problem, however, is to remove the noise from the broadband power spectral density. The widely know technique of using a narrow band filter in the frequency domain is ineffective with broadband sources. Namely, as illustrated in FIG. 5, because noise also has a broadband characteristic, whatever the filter retains will be predominately noise and not the power level of a point source.

Figure 6:
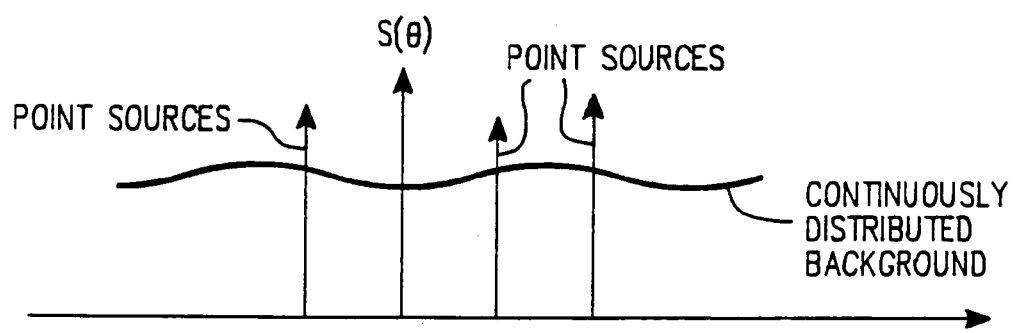
FIG. 6 is a graph of power spectral density of point sources as a function of angle.

The present invention provides a solution to this dilemma. FIG. 6 illustrates the power spectral density as a function of angle. In the angle domain, the spectral density of a point source is a spectral line or a delta function. Thus, by applying a narrow band filter in the angle domain, one can resolve signals having an energy level below the noise level. As a result, the power level from the noise is made very small with respect to the power coming from a point source. The angle domain narrow band filter is used to implement the beam forming which is discussed below. A combination of time domain beam forming and nonlinear spectral estimation are used to implement the angle domain narrow band filters.

Figure 7:
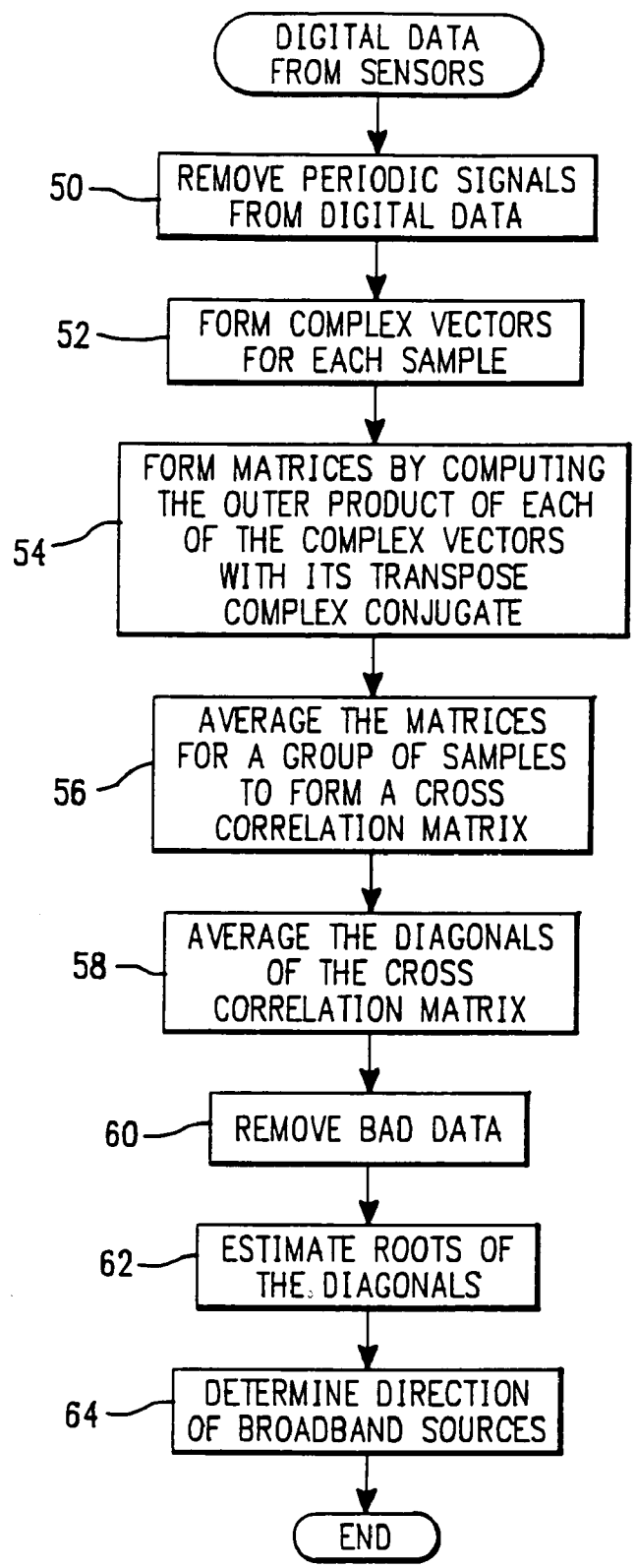
FIG. 7 is a flowchart illustrating the processing steps of the present invention.

FIG. 7 illustrates the processing steps of the present invention. The first step in the signal processing is to remove 50 the time periodic signals from the filtered signal $y_{ik}(t)$ using the Prony-Hildebrand approach to spectral estimation. The Prony-Hildebrand approach is described in S. Kay and S. Marple, "Spectrum Analysis. A Modern Perspective," Proceedings of the IEEE, Vol. 69, No. 11, November 1981, pp. 1380–1419 and is incorporated by reference herein. This processing step is performed as follows.

Assume $z(n)$ is a linear combination of M complex sinusoids representing the period signals, namely $$z(n) = \sum_{i=1}^{M} w_i e^{j\Theta_i n} \quad (3)$$

where each $e^{j\Theta_i}$ is a root of the polynomial and $w_i$ is a set of weights. Then the error sequence $e(n)$, polynomial $P(s)$ and coefficients $a_k$ are as follows:

$$0 = e(n) = \sum_{k=0}^{M} a_k z(n+k), \text{ for all } n \quad (4)$$

$$P(s) = \sum_{k=0}^{M} a_k s^k \quad (5)$$

$$a_k = a_{M-k}^*, k=0 \text{ to } M \quad (6)$$

Note, the use of the superscript * indicates the complex conjugate of the referenced complex number.

First, under the Prony-Hildebrand approach for spectral estimation, one seeks to determine the coefficients $a_k$ by solving the constrained minimization problem of $$\underset{\{a_k\}}{\text{Minimize}} \sum_{n=0}^{N} e(n) e^*(n) \quad (7)$$

$$\text{subject to } \sum_{k=0}^{M} r_k a_k a_k^* = 1 \quad (8)$$

where $r_k$ is a set of positive weights and M<<N. This is achieved by using known values of $z(n)$ to form the error sequence $e(n)$ according to equation (4). Then the minimization or linear constrained least squares problem can be solved using well known mathematical techniques.

Next, the roots of the polynomial given by equation (5) are found, that is, $e^{j\Theta_i}$, i=1 to M are determined. A second linear unconstrained least squares problem can be formulated to find the weights $w_i$ by substituting the $e^{j\Theta_i}$ into equation (3) and solving for the best fit. As a result, the time periodic components $yp_{ik}(nT)$ of $y_{ik}(nT)$ identified by equation (3) are subtracted from $y_{ik}(nT)$ to yield broadband samples $yw_{ik}(nT)$.

$$yw_{ik}(nT) = y_{ik}(nT) - yp_{ik}(nT) \quad (9)$$

In the second step, the broadband samples $yw_{ik}(nT)$ corresponding to a particular time slice are formed 52 into a vector $Y(nT)$.

$$Y(nT) = \begin{bmatrix} yw_1(nT) \\ yw_2(nT) \\ \vdots \\ yw_{Ns}(nT) \end{bmatrix} \quad (10)$$

From each vector $Y(nT)$ corresponding to each time slice a matrix $S(nT)$ is formed 54 during the third step by computing the outer product of vector $Y(nT)$ with its transpose complex conjugate. The matrix $S(nT)$ is a square matrix with dimensions $N_s$, where $N_s$ is the number of sensors.

$$S(nT) = Y(nT) Y^{*T}(nT) \quad (11)$$

Note, since the samples are complex numbers, the vector $Y(nT)$ and the matrix $S(nT)$ are also complex. Note, the use of superscript T indicates the transpose of the reference matrix.

After the formation 54 of a group of matrices $S(nT)$, each of which corresponds to a different vector $Y(nT)$ or time slice, the processing unit 36 proceeds to the next step. Although, a group of 10,000 matrices $S(nT)$ corresponding to 10,000 time slices would be preferable, any size group in the vicinity of 1000–10,000 matrices $S(nT)$ would be satisfactory.

The group of matrices $S(nT)$ are then averaged 56 during the fourth step to generate an average complex matrix S, $$S = \frac{1}{N_T} \sum_{n=1}^{N_T} S(nT) \quad (12)$$

where $N_T$ represents the number of time slices per group. The average complex matrix S is a cross correlation matrix which is hermitian 1symmetric and positive semi-definite.

Note, these signal processing steps assume a given look direction. Thus, if one desires a particular look direction, other than the look direction perpendicular to the array of sensors, then the complex samples must be time delayed steered prior to signal processing.

One can steer the beam in the direction $\phi_o$ if one forms S from $yw_{IK}(nT+(I-1)(d_k/c)\sin \phi_o)$, where c is the velocity of propagation and I is the sensor index. For a given plane wave arriving at an angle $\phi$ and having power P distributed over a broadband relative to the filter bandwidth, the I,J$^{th}$ elements of S are $$S(I,J) = P e^{j2\pi f(J-I)(d/c)\sin \phi} \quad (13)$$

When $\phi = \phi_o$, the matrix consists of complex sinusoids that depend only on the index difference J–I. Therefore, the elements along the diagonals of S have the same mean value and can be averaged 58 to improve the estimate. Accordingly, the main and super diagonals of S are than averaged 58 to form vector w(m), $$w(m) = \frac{1}{N_s + 1 - m} \sum_{i=1}^{N_{s+1-m}} S_{i,i+m-1} \quad (14)$$

where $S_{i,j}$ represents the $i,j^{th}$ components of matrix S. For example, the average across the main diagonal is component w(1) and the average across the first super diagonal is component w(2). A single point source will cause the spectra to have a form of $e^{jkc}$, where c is a is a function of angle f(θ). Thus c, although fixed for each point source, will change with different point sources. If the look direction is aimed directly at a point source, c would equal zero. The resulting waveform, however, is normally more complex as it relates to a number of different point sources.

In the fifth step of the processing, data from failed sensors is removed 60. A detailed discussion of this step is provided below.

During the sixth step of the processing, the method finds 62 the complex exponentials within the diagonal averages w(m). Briefly, the Prony-Hildebrand method is applied to the diagonal averages w(m) to produce a set of complex roots $$Z_i = a_i e^{j\theta_i}, \, i=1 \text{ to } M < N_s \quad (15)$$

Using only the angle of the polar form of the roots one can find 64 during the seventh step a first approximation of the arrival angles $\phi_i$ as $$\hat{\phi}_i = \sin^{-1}(c\theta_i/(2\pi f d)) \quad (16)$$

These values can then be substituted into equation (13) and an iterative least squares fit can be computed to converge to the best estimate of angles $\theta_i$, as well as powers $P_i$. The error standard deviation involved in estimating $\phi_i$ and $P_i$, is $$\sigma(P_i) = P_T \left[ \frac{2}{N_2(N_s - 1)N_T} \right]^{1/2} \quad (17)$$

$$\sigma(\phi_i) = \frac{P_T}{2\pi \beta_k P_i} \left[ \frac{12}{(N_s - 1)N_s^2(N_s + 1)N_T} \right]^{1/2} \text{ (radians)} \quad (18)$$

where $\beta_k = d_k/\lambda$, $P_i$ is the power from $i^{th}$ point source at a sensor, and $P_T$ is the total power received at the sensor.

Initially, we assume that the filters 32 have not induced any decay, but we later described a procedure for improving the accuracy of the system by taking into consideration the decay induced by the filter 32. Since there may be more than one point source in a given look direction one looks for several complex exponentials. For example, if one looks for two complex exponentials, the difference equation takes the form, $$aZ^{k+1} + bZ^k + a^* Z^{k-1} = 0 \quad (19)$$

where $Z_k = e^{jkc}$. Each point source in a given look direction has a different complex exponential corresponding to its direction. Assuming, multiple point sources with the given look direction, the complex polynomials multiply with one another. The result, therefore, is modeled as a polynomial equation, having the Z transform of $$(aZ^2 + bZ + a^*) \quad (20)$$

One then multiples the polynomial with a similar polynomial $$(cZ^2 + dZ + c^*) \quad (21)$$

The result will be of the form, $$a_k Z^k + a_{k-1} Z^{k-1} \ldots a_2 Z^2 + a_1 Z + a_0 \quad (22)$$

where the coefficients are complex and have mirror image symmetry. Thus, $a_k = a_0^*$, $a_{k-1} = a_1^*$, etc. If you have an odd order polynomial the center coefficient is equal to its own complex conjugate which is a real number.

Polynomials of this form have roots of the form $e^{jkc}$. The next step is to model the polynomial using a least squares fit approach to find the polynomial which models the data. The polynomial is modeled using w(m) and versions of w(m), shifted one or more indexes, are used to satisfy a difference equation of the form, $$ay_1 + by_2 + a^* y_3 = 0 \quad (23)$$

where subvectors $Y_2$ and $y_3$ are shifted portions of w(m). If the least squares method will not go to zero, one increases the order of the difference equation until a suitable fit is obtained.

Once the coefficients are obtained, they can be sent to readily available polynomial root solvers which will identify all the complex exponentials occurring as roots. From the complex exponentials one determines 64 the direction angles of the sources according to equation (16). The number of roots found 62 corresponds to the number of sources. The order of the polynomial being solved determines the number of roots the method will model. However, one can never find more sources than the number of sensors. Preferably, the number of sources being looked for is approximately one third of the number of sensors. For example, in a system with an array having 20 sensors, one would preferably look for up to 7 sources. Typically, one would initially look for 1, then 2, then 3, etc. sources up to, for example, 7 sources. In any case, the method resolves the most powerful sources first.

Once the roots are determined, the least squares estimation problem can be recast to obtain greater precision by factoring in the non-linear characteristics of the time delay filter. One can also use standard techniques for beam focusing once you have a rough estimate of range.

When these procedures are set up to be performed by a computer one must distinguish and separate out the real and imaginary parts to facilitate digital processing. Thus, the complex arithmetic is expressed in terms of real arithmetic as discussed in detail below.

The present invention is able to compensate for failed sensors or erroneous data. The present invention includes the step of averaging the elements in each of the diagonals. The reason for performing such averaging is that in theory if you had a source with no noise each diagonal element would be the same, thus by averaging the diagonal elements one can substantially eliminate the noise. The detection 60 of bad data is performed using the obtained averages. For example, based on a predetermined threshold one searches the diago nal elements to determine if any differ from the average by more than the predetermined threshold. If so, the data is deemed bad and it is removed 60 from further calculations. This is achieved by eliminating the data from that sensor and possibly sensors effected by the failed sensor. The average for the diagonal is then recalculated and further calculations performed using the recalculated average. This reduces the sensitivity of the system towards failed sensors. Thus, the system degrades gracefully when sensors fail.

The above discussion describes the present invention using complex numbers. However, in order to allow for computer processing one must express the complex arithmetic in terms of real arithmetic.

Under the Prony-Hildebrand approach for spectral estimation the computer processing needs to solve the constrained minimization problem of $$\text{Minimize } a^{*T}(W^{*T}\Sigma_A^{-1}W)a, \text{ subject to } a^{*T}\Sigma_c a=1, \quad (24)$$

where W is a complex matrix based on w(m) of equation (14). The problem is transformed into real arithmetic which can be performed using readily available subroutines.

The index shifting discussed above is then illustrated by complex matrix W defined as $$w = \begin{bmatrix} z_1 & z_2 & z_3 & \cdots & z_m \\ z_2 & z_3 & z_4 & \cdots & z_{m+1} \\ z_3 & z_4 & z_5 & \cdots & z_{m+2} \\ \vdots & & & & \\ z_{Nsp-m-1} & \cdots & & & z_{Nsp} \end{bmatrix} \quad (25)$$

which is an $N_w$ by M complex matrix, where M is the number of coefficients in the polynomial coefficient vector a, Ip is the first position of w(m) to be used, $N_{sp}=N_s-Ip-1$ describes the dimension of Z, $Z_m=w(m+Ip-1)$, and m=1 to $N_s-Ip+1$. Typically, Ip=2 so that the first diagonal is dropped off because the main diagonal has elements which are proportional to the total power of all sources as well as the noise.

The noise level is next estimated so that each diagonal element can be weighted inversely proportional to the noise level. This optional procedure uses a diagonal matrix $\Sigma_A$ to suppress the noise within the model.

$$\text{diag } \Sigma_A^{-1} = \frac{1}{\sigma_{Ai}^2}, i = 1 \text{ to } N_w \quad (26)$$

with $N_w=N_{sp}-M+1$ where, $$\text{diag } \Sigma A = \sigma_{Ai}^2 = \sum_{k=1}^{M} \rho_{k+i+1}, i = 1 \text{ to } N_w \quad (27)$$

and, $$\rho_i = \frac{1}{N_{sp}+1-i}, i = 1 \text{ to } N_{sp} \quad (28)$$

The diagonal matrix $\Sigma_c$ of equation (24) has elements that estimate the variation of the signals from the mean value. The elements of $\Sigma_c$ are defined as $$\Sigma_c = E\{(W^{*T}-\overline{W}^*)\Sigma_A^{-1}(W-\overline{W})\} \quad (29)$$

where E(x) is the expected valve or average value of x.

The diagonal matrix has M diagonal elements expressed by the following equation.

$$\text{diag } \Sigma_c = \sigma_{ci}^2, = \sum_{k=1}^{N_w} \frac{\rho_{k+i-1}}{\sigma_{Ak}^2}, i = 1 \text{ to } M \quad (30)$$

Next, the problem is reformulated in terms of purely real arithmetic for computer processing. The complex vector a is broken into its real and imaginary parts. First, let $a=a_R+ja_I$, where $a_R$ and $a_I$ are real vectors then $$a^*\Sigma_c a = a_R^T \Sigma_c a_R + a_I^T \Sigma_c a_I \quad (31)$$

In addition, let $$Wa=\mu+jv, \quad (32)$$

where $\mu$ and $v$ are real vectors then the minimization problem is reformulated as $$a^{*T}W^{*T}\Sigma_A^{-1}Wa = \mu^T\Sigma_A^{-1}\mu + v^T\Sigma_A^{-1}v \quad (33)$$

Moreover, let $$W=W_R+jW_I \quad (34)$$

then $$\begin{bmatrix} u \\ v \end{bmatrix} = \begin{bmatrix} W_R & -W_I \\ W_I & W_R \end{bmatrix} \begin{bmatrix} a_R \\ a_I \end{bmatrix} \quad (35)$$

This illustrates a partition matrix having sub-blocks corresponding to equation (34).

Finally, $a_R$ and $a_I$, must be expressed in terms of the constraint on the polynomial.

$$a_i = a_{M-i+1}^*, i=1 \text{ to } M \quad (36)$$

This expresses the symmetry of the coefficients of the polynomial of which the roots are to be determined. Namely, the coefficients starting at opposite ends of the polynomial are complex conjugates of one another. The mathematical effect of this constraint is to make the unit circle in the complex domain the most probable locus of the roots of the polynomial.

Next $a_i$ is broken down into its real and imaginary parts.

$$a_i = x_i + jy_i \quad (37)$$

where i=1 to M/2 or (M+1)/2

As a result, a real coefficient vector is $$a_R = H_1 x \quad (38)$$

and a imaginary coefficient vector is $$a_I = H_2 y \quad (39)$$

When M is even, x and y each have M/2 elements. When M is odd, x has (M+1)/2 elements and y has (M−1)/2 elements. $H_1$ and $H_2$ are defined as follows. If M is even, then $$H_1 = \begin{bmatrix} 1 & & & \\ & 1 & & \\ & & \cdot & \\ & & & \cdot \\ & & & & 1 \\ & & & & & 1 \\ & & & \cdot & \\ & & \cdot & & \\ & 1 & & & \\ 1 & & & & \end{bmatrix} \text{ and } H_2 = \begin{bmatrix} 1 & & & \\ & 1 & & \\ & & \cdot & \\ & & & \cdot \\ & & & & 1 \\ & & & & & -1 \\ & & & \cdot & \\ & & \cdot & & \\ & -1 & & & \\ -1 & & & & \end{bmatrix} \quad (40)$$

with dimensions of M by M/2. On the other hand, if M is odd, then $$H_1 = \begin{bmatrix} 1 & & & \\ & 1 & & \\ & & \cdot & \\ & & & \cdot \\ & & & & 1 \\ & & & & & 1 \\ & & & \cdot & \\ & & \cdot & & \\ & 1 & & & \\ 1 & & & & \end{bmatrix} \text{ and } H_2 = \begin{bmatrix} 1 & & & \\ & 1 & & \\ & & \cdot & \\ & & & \cdot \\ & & & & -1 \\ & & & & & 0 \\ & & & & & -1 \\ & & & \cdot & \\ & & \cdot & & \\ & -1 & & & \\ -1 & & & & \end{bmatrix} \quad (41)$$

with dimensions of M by (M+1)/2.

Next a series of real matrices are defined.

Let $$J = \begin{bmatrix} H_1 & 0 \\ 0 & H_2 \end{bmatrix}, \text{ dimensions } 2M \text{ by } M \quad (42)$$

$$R_A = \begin{bmatrix} \Sigma_A^{-1/2} & 0 \\ 0 & \Sigma_A^{-1/2} \end{bmatrix}, \text{ dimensions } 2N_w \text{ by } 2N_w \quad (43)$$

$$R_c = \begin{bmatrix} \Sigma_c & 0 \\ 0 & \Sigma_c \end{bmatrix}, \text{ dimensions } 2M \text{ by } 2M \quad (44)$$

$$Q = \begin{bmatrix} W_R & -W_I \\ W_I & W_R \end{bmatrix}, 2N_w \text{ by } 2M \quad (45)$$

and $$b = \begin{bmatrix} x \\ y \end{bmatrix}, \text{ a vector with } M \text{ elements} \quad (46)$$

Two more real matrices A and $B^2$ are then defined.

$$A = R_A \cdot Q \cdot J \quad (47)$$

$$B^2 = J^T \cdot R_c \cdot J, \text{ a diagonal matrix} \quad (48)$$

Thus, the constrained minimization problem of the Prony-Heldebrand approach for spectral estimation corresponding to equation (24) can be reformulated to consist of entirely real terms as follows.

Minimize $$a^{*T}(W^{*T}\Sigma_A^{-1}W)a = b^T A^T A \, b \quad (49)$$

with the constraint $$a^{*T}\Sigma_c a = b^T B^2 b = 1$$

Now that the problem has been reformulated into real numbers, the solution can be obtained. First a change of variables is made. Let $$b = B^{-1}\alpha \quad (50)$$

then the solution is to minimize $$\alpha^T B^{-1} A^T A \, B^{-1} \alpha \quad (51)$$

subject to $$\alpha^T \alpha = 1 \quad (52)$$

This places the condition in a convenient form, such that the solution is to find the a which corresponds to the eigenvector having the smallest eigenvalue of $$B^{-1}A^T A B^{-1} \quad (53)$$

where the matrix is a semidefinite symmetric matrix. Further, let $\alpha_o$ be the determined eigenvector, then $$b(o) = B^{-1}\alpha_o \quad (54)$$

Standard routines in readily available linear algebra optimization packages are able to determine the eigenvector corresponding to the smallest eigenvalue. From equation (46) x and y are determined by partitioning vector b. The first half of coefficients of b are x and the second half are y. From x and y, one solves for the coefficients of the polynomial.

According to equations (37) and (38), $a_R = H_1 x$ and $a_I = H_2 y$. Once these coefficients have been determined, one sends them to a standard root finding routine which will compute roots of complex polynomials. The roots of the complex polynomial are of the form, $$a_i + jb_i \; i=1 \text{ to } M-1 \quad (55)$$

Each root is then describes as, $$\mu_i = \frac{1}{2\pi\beta}\tan^{-1}(b_i/a_i), \; i = 1 \text{ to } M - 1 \quad (56)$$

where $\beta = d_k/\lambda$ and $\lambda$ is the wavelength of a wave in water equal at the carrier frequency. The direction of each of the located point sources can then be computed according to the following equation.

$$\phi_i = \frac{180}{\pi}\sin^{-1}\mu_i \quad (57)$$

Next we describe an optional refinement procedure which reduces the error, within the model to more accurately determine the angular position of the point sources.

Filter 32 has a time domain impulse response h(t). When white noise passes through the filter 32 the auto-correlation of the output noise is R(s), defined as $$R(s) = \int_{-\infty}^{\infty} h(t+s)h(t)dt \quad (58)$$

Therefore, since R(s) does change, the estimate matrix is modified by R(s). Thus, equation (11) is modified to the follow form $$S_k(I,J) = P e^{j2\pi f(J-I)(d_k/c)\sin\phi} \cdot R[(d_k/c)(J-I)\cdot(\sin\phi - \sin\phi_o)] \quad (59)$$

Where J is the column index and I is the row index. This takes into account that the filter 32 makes the average matrix S vary more complex than the original simple complex expediential corresponding to equation (13). Previously we assumed R(s)=1 and had S(nT) as a simple complex exponential.

The filter 32 impulse response h(t) has the Laplace transform $$H(s) = \frac{1}{s^2 + 2a_0 s + a_0^2 + b_0^2} \quad (60)$$

where $a_o$, $b_o$ are constants.

Previously, using equation (56) we determined $\mu_i$ from the roots of the polynomial. Now we improve the estimate of $\mu_i$ by incorporating the affect of the filter 32 on the average matrix.

Starting with the $\mu_i$'s determined using equation (56), one iteratively goes through a procedure which computes $\mu_i$ and its associated power $P_i$ while seeking to minimize the error vector $\epsilon$.

$$\epsilon(k) = \begin{bmatrix} \Sigma^{-1} & 0 \\ 0 & \Sigma_p^{-1} \end{bmatrix}\begin{bmatrix}\begin{bmatrix} W_R \\ W_I \end{bmatrix} - f(P(k),\mu(k)) \end{bmatrix} \quad (61)$$

where $\Sigma\rho = \text{diag}[\rho_i^{1/2}]$

Thus the iterative procedure is a least squares problem of minimizing $g^T g$, where, $$g(k) = \epsilon(k) - [C(k), D(k)]\begin{bmatrix} \Delta P(k) \\ \Delta\mu(k) \end{bmatrix} \quad (62)$$

and where A(k) and B(k) are partial derivatives $$C(k) = \Sigma_p^{-1}\frac{\partial f}{\partial P(k)^T}; \; D(k) = \Sigma_p^{-1}\frac{\partial f}{\partial \mu(k)^T} \quad (63)$$

Note, C(k) is the Jacobian of f with respect to P and D(k) is the Jacobian1 of f with respect to $\mu$.

Thus, the least squares problem is solved in terms of $\Delta\mu(k)$ and $\Delta P(k)$. The starting solutions $\mu(o)$ and P(o) are defined as $$\mu(o)=\mu_i, \text{ (see equation (56))} \quad (64)$$

and $$P(o) = [C(o)^T C(o)]^{-1} C(o)^T \begin{bmatrix} W_R \\ W_I \end{bmatrix} \quad (65)$$

Once a solution is obtained $\mu(k)$, P(k), C(k) and D(k) are updated such that, $$\mu(k+1)=\mu(k)+\Delta\mu(k) \quad (66)$$

$$P(k+1)=P(k)+\Delta P(k) \quad (67)$$

The least squares problem is then repeated. This iterative procedure continues until $\Delta\mu(k)$ and $\Delta P(k)$ no longer substantially change. Standard software routines are able to perform such least squares processing.

Next, the complex matrices C and D are converted into next real matrices. C can be broken into a partition matrix.

$$C = \begin{bmatrix} C_R \\ C_I \end{bmatrix} \quad (68)$$

The elements of $C_R$ and $C_I$ are defined as $$cr_{ij}=mr_{ij}(f_o,\mu_j); \; ci_{ij}=mi_{ij}(f_o,\mu_j) \quad (69)$$

when $\mu_j \geq 0$, and $$cr_{ij}=mr_{ij}(-f_o,\mu_j); \; ci_{ij}=mi_{ij}(-f_o,\mu_j) \quad (70)$$

when $\mu_j<0$, where $mr_{ij}$ and $mi_{ij}$ are defined as follows $$mr_{ij}(f_o,\mu_j) = \frac{e^{-(i-1)(a_o/f_o)\beta\mu_j}}{\rho_{i-lp+1}^{1/2}\cos\gamma_o}[\cos(i-1)2\pi\beta\mu_j]\cdot\cos[(i-1)(b_o/f_o)\beta\mu_j - \gamma_o] \quad (71)$$

$$mr_{ij}(f_o,\mu_j) = \frac{e^{-(i-1)(a_o/f_o)\beta\mu_j}}{\rho_{i-lp+1}^{1/2}\cos\gamma_o}[\sin(i-1)2\pi\beta\mu_j]\cdot\cos[(i-1)(b_o/f_o)\beta\mu_j - \gamma_o] \quad (72)$$

for i=Ip to $N_s$ and j=1 to M−1.

Likewise D can be broken down into a partition matrix.

$$D = \begin{bmatrix} D_R \\ D_I \end{bmatrix} \quad (73)$$

the elements of $D_R$ are defined as $$dr_{ij}=nr_{ij}(f_o,\mu_j);\ di_{ij}=ni_{ij}(f_o,\mu_j) \quad (74)$$

when $\mu_j \geq 0$, and $$dr_{ij}=nr_{ij}(-f_o,\mu_j);\ di_{ij}=ni_{ij}(-f_o,\mu_j) \quad (75)$$

when $\mu_j < 0$, where $nr_{ij}$ and $ni_{ij}$ are defined as follows $$nr_{ij}(f_o, \mu_j) = \frac{(i-1)\beta P}{\rho_i^{1/2}\cos\gamma_o} j e^{-(i-1)(a_o/f_o)\beta\mu_j} \cdot \quad (76)$$

$$\left\{ \frac{-a_o}{f_o}[\cos(i-1)2\pi\beta\mu_j]\cos[(i-1)(b_o/f_o)\beta\mu_j - \gamma_o] - \right.$$

$$2\pi[\sin(i-1)2\pi\beta\mu_j]\cos[(i-1)(b_o/f_o)\beta\mu_j - \gamma_o] -$$

$$\left. \frac{b_o}{f_o}[\cos(i-1)2\pi\beta\mu_j]\sin[(i-1)(b_o/f_o)\beta\mu_j - \gamma_o] \right\}$$

and $$ni_{ij}(f_o, \mu_j) = \frac{(i-1)\beta P}{\rho_i^{1/2}\cos\gamma_o} j e^{-(i-1)(a_o/f_o)\beta\mu_j} \cdot \quad (77)$$

$$\left\{ \frac{-a_o}{f_o}[\sin(i-1)2\pi\beta\mu_j]\cos[(i-1)(b_o/f_o)\beta\mu_j - \gamma_o] + \right.$$

$$2\pi[\cos(i-1)2\pi\beta\mu_j]\cos[(i-1)(b_o/f_o)\beta\mu_j - \gamma_o] -$$

$$\left. \frac{b_o}{f_o}[\sin(i-1)2\pi\beta\mu_j]\sin[(i-1)(b_o/f_o)\beta\mu_j - \gamma_o] \right\}$$

for i=Ip to $N_s$ and j=1 to M-1, where i is the row index and j is the column index. Constants $a_o$, $b_o$ and $\beta$ were defined above, and $\gamma_o$ is defined as follows.

$$\gamma_o = \tan^{-1}(a_o/b_o) \quad (78)$$

Moreover, $\epsilon(k)$ of equation (61) can be simplified by noting $$\Sigma\rho^{-1}f(P,\mu)=C\cdot P \quad (79)$$

With the definitions of matrices C and D, which are functions of $\mu$ and P, one uses the least squares program to minimize error. After the least squares process converges, the directions of the point sources relative to the array are defined by $\gamma_j$ were $$\phi_j = \frac{180}{\pi}\sin^{-1}\mu_j, \text{ for } j = 1 \text{ to } M-1 \quad (80)$$

Thus, this method incorporates the effects of filter 32 on the diagonal averages of the cross correlation matrix S. For the estimated power of a signal P one can determine how far below the noise level it is. If its too low, it can be disregarded as an artifact of the process.

The many features and advantages of the invention are apparent from the detailed specfication and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for detecting a broadband frequency emitting source using an array of sensors for receiving broadband signals, said method comprising the steps of:
   (a) converting the broadband signals into digital data by sampling the broadband signals at a predetermined sampling rate; and
   (b) detecting spatial coherence of the digital data by effectively applying an angle-domain narrow band filter.

2. A method for detecting a broadband frequency emitting source using an array of sensors for receiving broadband signals, the broadband signals of a spectrum having a spectrum wavelength corresponding to a center frequency of the spectrum, the sensors of the array are spaced a distance greater than one-half of the spectrum wavelength, said method comprising the steps of:
   (a) generating complex data from the broadband signals received by the sensors in dependence upon the center frequency;
   (b) converting the complex data into complex digital data by sampling the complex data at a predetermined sampling rate;
   (c) processing the complex digital data to detect the presence of the broadband frequency emitting source by effectively applying an angle-domain narrow band filter; and
   (d) determining, based on said processing step (c), a direction of the detected source relative to the array.

3. A method as recited in claim 2, wherein the broadband frequency emitting source is in an area having a noise level, and said determining step (d) comprises detecting the broadband frequency emitting source having an energy level below the noise level of the area.

4. A method as recited in claim 3, wherein said processing step (c) comprises the substeps of:
   (i) forming complex broadband data by removing time periodic signals from the complex digital data;
   (ii) forming a plurality of complex vectors from the complex broadband data, each vector corresponding to a sample of the broadband signals received by the sensors;
   (iii) converting the plurality of complex vectors into complex data matrices by computing an outer product of each of the complex vectors with a transpose complex conjugate of each of the complex vectors;
   (iv) averaging the complex data matrices corresponding to a predetermined number of samples to generate an average complex data matrix having diagonals;
   (v) averaging the diagonals of the average complex data matrices to form a complex root vector; and
   (vi) solving for roots of a difference equation that the complex root vector satisfies.

5. A method as recited in claim 4, wherein said converting step (b) is performed with the predetermined sampling rate below the Nyquist frequency.

6. A method as recited in claim 5, wherein said processing step (c) further comprises the substeps of:
   (vii) averaging the elements of the diagonals of the average complex data matrices to generate diagonal averages;

(viii) comparing the elements of the diagonals with the one of the diagonal averages corresponding thereto; and (ix) removing the complex broadband data corresponding to sensors that have been determined to have failed in response to said comparing.

7. A method for detecting angular direction of broadband frequency emitting sources using first and second arrays of sensors for receiving broadband signals, the broadband signals of a spectrum having a spectrum wavelength corresponding to a center frequency of the spectrum, the sensors of the first array are uniformly spaced apart a first distance greater than one-half of the spectrum wavelength, said method comprising the steps of:

(a) synchronously modulating the broadband signals received by the sensors of the second array to generate modulated signals using a carrier signal having the center frequency;

(b) filtering the modulated signals with a time-domain low pass filter to generate complex analog data;

(c) converting the complex analog data into complex digital data by sampling the complex analog data at a predetermined sampling rate;

(d) processing the complex digital data to detect the presence of the broadband frequency emitting sources by angle-domain narrow band filtering;

(e) determining, based on said processing step (d) corresponding to the complex digital data of the second array, a coarse estimate of the angular direction of detected sources relative to the array; and (f) repeating steps (a) through (d) for the broadband signals received by the sensors of the first array to determine, based upon the coarse estimate from step (e), a precise estimate of the angular direction of the broadband frequency emitting sources relative to the array.

8. A method as recited in claim 7, wherein the sensors of the second array are spaced apart a second distance less than one-half of the spectrum wavelength.

9. A method for detecting broadband frequency emitting sources as recited in claim 7, wherein the sensors of the second array are spaced apart a second distance greater than one-half of the spectrum wavelength, and the sensors of the first and second arrays are spaced apart with the reciprocals of the first and second distances relatively prime.

10. A method as recited in claim 8, wherein the broadband frequency emitting sources are in an area having a noise level, and said processing step (d) includes the step of detecting the broadband frequency emitting sources having an energy level below the noise level of the area.

11. A method as recited in claim 10, wherein said processing step (d) comprises the steps of:

(i) estimating time periodic signals within the complex digital data using nonlinear spectral estimation of the time periodic signals in the time domain;

(ii) forming complex broadband data by removing the time periodic signals from the complex digital data;

(iii) forming a plurality of complex vectors from the complex broadband data, each vector corresponding to a sample of the broadband signals received by the sensors;

(iv) converting the plurality of complex vectors into complex data matrices by computing an outer product of each of the complex vectors with a transpose complex conjugate of each of the complex vectors;

(v) averaging the complex data matrices corresponding to a predetermined number of samples to produce a cross correlation matrix having diagonals;

(vi) averaging the diagonals of the cross correlation matrix to form a complex root vector having roots; and (vii) estimating the roots of the diagonals of the cross correlation matrix using nonlinear spectral estimation in a angular domain.

12. A method as recited in claim 11, wherein said processing step (d) further comprises the step of removing the complex broadband data corresponding to sensors that have failed.

13. A method as recited in claim 12, wherein said converting step (c) is performed with the predetermined sampling rate below the Nyquist frequency.

14. A method as recited in claim 11, wherein said method further comprises the step of (e) forming a beam for analyzing the detected sources.

15. A method for detecting angular direction of broadband frequency emitting sources using first and second collinear arrays of sensors for receiving broadband signals, the broadband signals of a spectrum having a spectrum wavelength corresponding to a center frequency of the spectrum, the sensors of the first collinear array are uniformly spaced apart a first distance greater than one-half of the spectrum wavelength, comprising the steps of:

(a) synchronously modulating the broadband signals received by the sensors of the second collinear array to generate modulated signals using a carrier signal having the center frequency;

(b) filtering the modulated signals with a time-domain low pass filter to generate complex analog data;

(c) converting the complex analog data into complex digital data by sampling the complex analog data at a predetermined sampling rate below a Nyquist frequency;

(d) estimating time periodic signals within the complex digital data using nonlinear spectral estimation of the time periodic signals in the time domain;

(e) forming complex broadband data by removing the time periodic signals from the complex digital data;

(f) forming a plurality of complex vectors from the complex broadband data, each vector corresponding to a sample of the broadband signals received by the sensors;

(g) converting the plurality of complex vectors into complex data matrices by computing an outer product of each of the complex vectors with a transpose complex conjugate of each of the complex vectors;

(h) averaging the complex data matrices corresponding to a predetermined number of samples to produce a cross correlation matrix having diagonals;

(i) removing the complex broadband data corresponding to sensors that have failed;

(j) averaging the diagonals of the cross correlation matrix to form a complex root vector having roots;

(k) estimating the roots of the diagonals of the cross correlation matrix using nonlinear spectral estimation in an angular domain;

(l) determining from the complex digital data of the second collinear array a coarse estimate of the angular direction of detected sources relative to the array; and (m) repeating steps (a) through (k) for the broadband signals received by the sensors of the first collinear array to determine, based upon the coarse estimate from step (l), a precise estimate of the angular direction of the broadband frequency emitting sources relative to the array.

16. A system for detecting a broadband frequency emitting source by receiving broadband signals, the broadband signals of a spectrum having a spectrum wavelength corresponding to a center frequency of the spectrum, said system comprising:
a collinear array of sensors having a sensor-to-sensor spacing greater than one-half of the spectrum wavelength for receiving the broadband signals; and
filter means for producing an angle domain narrow band filter to detect the presence and angular position of the broadband frequency emitting source based on spatial coherence of the broadband signals.

17. A system for detecting a broadband frequency emitting source by receiving broadband signals, the broadband signals of a spectrum having a spectrum wavelength corresponding to a center frequency of the spectrum, said system comprising:
a first array of sensors having a first sensor-to-sensor spacing greater than one-half of the spectrum wavelength;
generator means for generating complex data from the broadband signals received by the sensors;
conversion means for converting the complex data into complex digital data at a predetermined sampling rate; and
control means for processing the complex digital data to detect the presence and angular position of the broadband frequency emitting source by angle domain narrow band filtering.

18. A system as recited in claim 17, wherein the spacing between the sensors of said first array are substantially equal, and the sensors of said first array are arranged to form a substantially linear array.

19. A system as recited in claim 18, wherein the predetermined sampling rate is below the Nyquist frequency.

20. A system as recited in claim 19, wherein said control means comprises:
means for forming complex broadband data by removing time periodic signals from the complex digital data;
means for forming a plurality of complex vectors from the complex broadband data, each vector corresponding to a sample of the broadband signals received by the sensors;
means for converting the plurality of complex vectors into complex data matrices by computing an outer product of each of the complex data matrices;
means for averaging the complex data matrices corresponding to a predetermined number of samples to generate an average complex data matrix having diagonals;
means for averaging the diagonals of the average complex data matrices to form a complex root vector; and
means for solving for roots of a difference equation that the complex root vector satisfies.

21. A system as recited in claim 20, wherein said control means further comprises means for removing the complex broadband data corresponding to sensors determined to have failed.

22. A system as recited in claim 18, further comprising a second array of linearly spaced sensors having a second sensor-to-sensor spacing less than one-half of the spectrum wavelength.

23. A system as recited in claim 18, further comprising a second array of sensors having a second sensor-to-sensor spacing greater than one-half of the spectrum wavelength, and the reciprocals of the first and second sensor-to-sensor spacing are relatively prime.

24. A system as recited in claim 19, wherein said control means comprises:
means for estimating time periodic signals within the complex digital data using nonlinear spectral estimation of the time periodic signals in the time domain;
means for forming complex broadband data by removing the time periodic signals from the complex digital data;
means for forming a plurality of complex vectors from the complex broadband data, each vector corresponding to a sample of the broadband signals received by the sensors;
means for converting the plurality of complex vectors into complex data matrices by computing an outer product of each of the complex vectors with a transpose complex conjugate of each of the complex vectors;
means for averaging the complex data matrices corresponding to a predetermined number of samples to generate a cross correlation matrix having diagonals;
means for averaging the diagonals of the average complex data matrices to form a complex root vector having roots; and
means for estimating the roots of the complex root vector using nonlinear spectral estimation in an angular domain.

25. A system for detecting broadband frequency emitting sources by receiving broadband signals, the broadband signals of a spectrum having a spectrum wavelength corresponding to a center frequency of the spectrum, said system comprising:
a first collinear array of sensors having a first sensor-to-sensor spacing greater than one-half of the spectrum wavelength for receiving the broadband signals;
a second collinear array of linearly spaced sensors having a second sensor-to-sensor spacing for receiving the broadband signals;
modulation means for generating complex data from the broadband signals received by the sensors in dependence upon the center frequency;
conversion means for converting the complex data into complex digital data at a predetermined sampling rate below the Nyquist frequency; and
control means for processing the complex digital data to detect the presence and angular position of the broadband frequency emitting sources by angle domain narrow band filtering, said control means includes means for forming complex broadband data by removing time periodic signals from the complex digital data;
means for forming a plurality of complex vectors from the complex broadband data, each vector corresponding to a sample of the broadband signals received by the sensors;
means for converting the plurality of complex vectors into complex data matrices by computing the outer product of each of the complex data matrices;
means for averaging the complex data matrices corresponding to a predetermined number of samples to generate an average complex data matrix having diagonals;
means for removing the complex broadband data corresponding to sensors determined to have failed;
means for averaging the diagonals of the average complex data matrices to form a complex root vector; and
means for solving for roots of a difference equation that the complex root vector satisfies.

* * * * *